INVENTOR
HANS GLEICHMANN
BY ATTORNEYS

Jan. 25, 1938. H. GLEICHMANN 2,106,346
POWER PLANT
Original Filed Sept. 28, 1933 3 Sheets-Sheet 3

INVENTOR
HANS GLEICHMANN
BY ATTORNEYS
Cooper, Kerr & Dunham

Patented Jan. 25, 1938

2,106,346

UNITED STATES PATENT OFFICE 2,106,346

POWER PLANT

Hans Gleichmann, Falkenhain, near Spandau, Germany, assignor to Siemens-Schuckertwerke Aktiengesellschaft, Berlin-Siemensstadt, Germany, a corporation of Germany Application September 28, 1933, Serial No. 691,349. Renewed April 10, 1937. In Germany September 30, 1932

26 Claims. (Cl. 60—106)

My invention relates to steam power plants and it has for an object to provide apparatus of this character with improved means for controlling the generation of steam.

A further object of my invention is to provide a power plant wherein the steam generator is capable of supplying steam at pressures which increase and decrease with increases and decreases in load so that the weight-volume may be varied suitably to the load with maintenance of approximately constant volume at variable loads.

A further object of my invention is to provide a steam generator of the forced passage type and delivering steam to the prime mover and having the supplies of feed water and heat for the generator under control of the load imposed on the prime mover.

A further object of my invention is to provide a power plant including a steam generator of the forced passage type supplying steam to a prime mover and which is arranged to operate at substantially constant pressure up to a predetermined load and at variable pressures thereabove.

A further object of my invention is to provide a power plant including a forced passage steam generator and a prime mover with a governor-control valve in the steam supply line for the prime mover and means responsive to differential pressure across the valve for controlling the supplies of feed water and heat to the generator.

A further object of my invention is to provide a variable pressure cycle power plant including a steam turbine having steam bled therefrom for operating an auxiliary turbine, the latter driving the auxiliaries for supplying feed water, fuel and air to the steam generator.

A further object of my invention is to provide a power plant including a steam generator supplying steam to a prime mover and wherein the auxiliaries for furnishing feed water, fuel and air to the generator are operated in accordance with the load imposed on the prime mover.

A further object of my invention is to provide a steam generator supplying steam to a prime mover, the generator being operated in such manner as to supply steam at pressure dependent upon the load and at approximately constant temperature for all loads.

Figure 5:
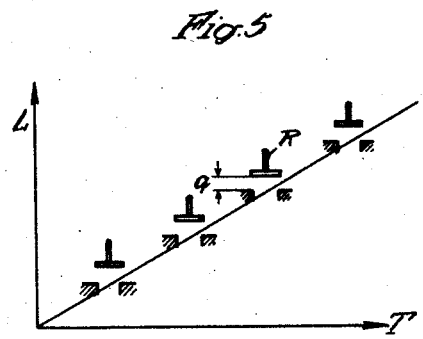
Figure 6:
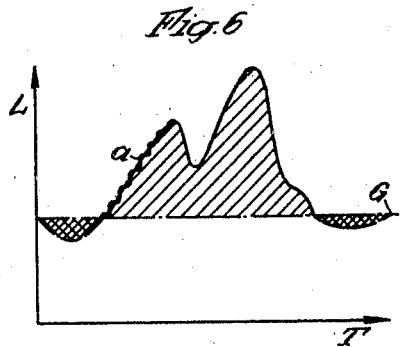
Figure 7:
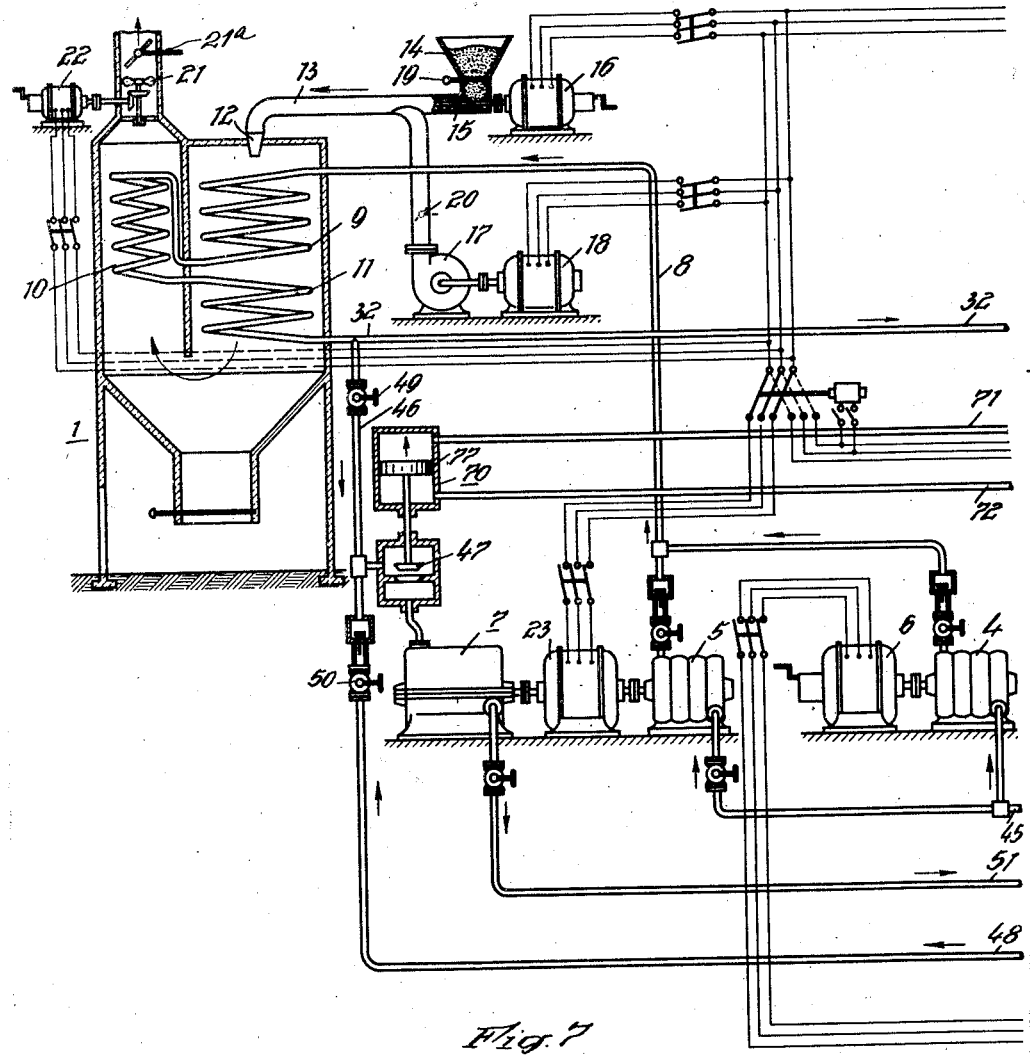
Figure 7A:
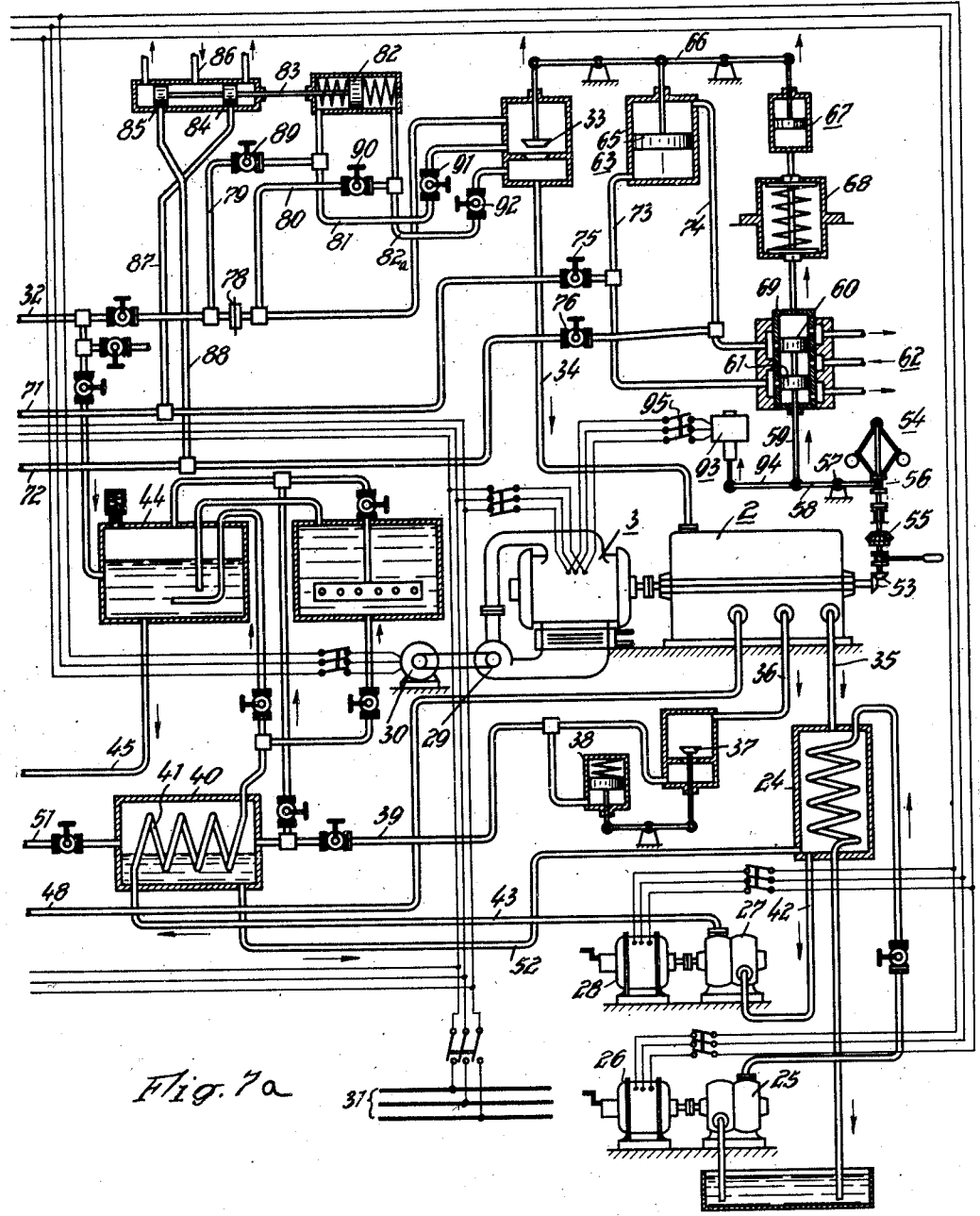

These and other objects are effected by my invention as will be apparent from the following description and claims, taken in connection with the accompanying drawings, forming a part of this application, in which:

Figs. 1 to 6, inclusive, are diagrams facilitating an understanding of my invention; and Figs. 7 and 7A together show an outline of a power plant incorporating my improvements.

The regulation of a power system involves both the production and consumption of energy. Since energy is initially produced in the boiler or generator, regulation of the system is not completed merely by regulation of the prime mover, or energy transformer. Accordingly, my improved system contemplates the use of means responsive to load imposed on the prime mover for controlling the steam generator in order that the generation of steam may be coordinated with power development.

Figure 1:
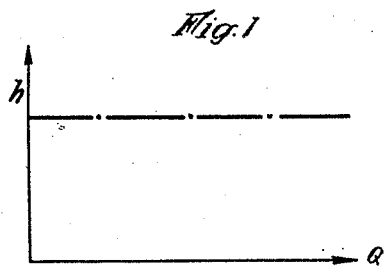

It is customary practice to control the boiler or generator so as to supply steam of approximately constant properties and to vary the supply of such steam to the prime mover by means operated in response to load imposed thereon. If, as shown in Fig. 1, the quantity, $Q$, of steam is generated at pressure, $h$, and if the quantity of steam produced in the generator is equal to that supplied to the prime mover, then a horizontal line is obtained, that is, the pressure of the working medium developed by the generator is maintained uniform for all loads. This may be accomplished by increasing the supply of heat and consequently the production of steam with increase in load and vice versa.

Figure 2:
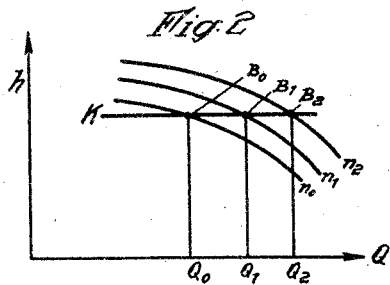

While slight fluctuations are unfavorable in actual practice, yet the ordinary standard steam generator, operating in the above manner, differs from the type of generator having forced passage of operating medium, for, with the latter type, the capacity for storage of water is very limited; and, consequently, in operation, the quantity of water supplied by the feed pump must be made equal to the quantity of steam leaving the boiler. Accordingly, a boiler of the forced passage type must be regulated in accordance with the load so as to maintain a linear relation as between the quantity of water supplied and the quantity of steam consumed. This relationship is shown in Fig. 2, it being assumed that the boiler feed pump is of the centrifugal type and serves to feed as well as to maintain the forced passage of operating medium. The pressure of operating medium in the generator, and including steam issuing therefrom, may be maintained substantially constant by suitable pressure-limiting means associated with the pump.

In Fig. 2, the boiler load $Q$ of a forced passage boiler is plotted against the boiler pressure $h$, the constant boiler pressure prevailing at different loads being represented by the horizontal line K. The three curves $n_0$, $n_1$, and $n_2$ represent three different speeds of the centrifugal pump and the relationship between pressure and quantity of feed. The points of intersection $B_0$, $B_1$, and $B_2$ of these curves with the straight line K determine the operating points and/or the speeds of the centrifugal pump for the corresponding boiler loads $Q_0$, $Q_1$, and $Q_2$.

Figure 3:
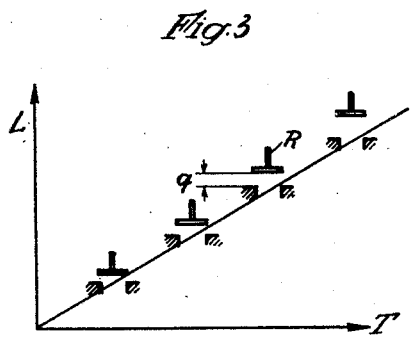

With a boiler of the constant pressure type, irrespective of the manner in which it is regulated to provide steam at constant pressure, it is necessary to vary the admission of steam to the prime mover in order that the latter may be operated suitably to carry the load. In Fig. 3, the load L is plotted against time T, it being assumed that the load increases with increase in time. Since the steam is at constant pressure and temperature, it necessarily has a specific volume and heat content dependent thereon; and, in consequence, if the output of the prime mover is increased the quantity of steam admitted thereto must also be increased. Hence, in Fig. 3, the inlet cross-section $q$ is dependent on the load, the regulating member R operating to vary the inlet area in accordance with the load.

Figure 4:
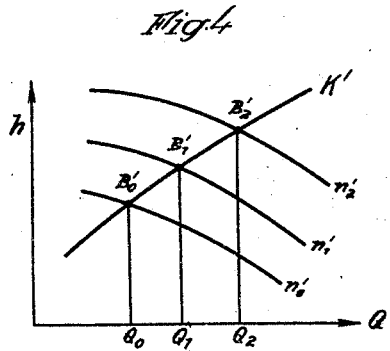

The principal object of the present invention is to provide a novel method of regulation as compared to methods hitherto known and carried out according to Figs. 1 and 2. To satisfy fluctuations of load in high-pressure plants, in accordance with my invention, the steam generator is operated to supply steam under pressure dependent upon the load and at substantially constant temperature, the pressure increasing with increase in load and vice versa. In Fig. 4, the line $K^1$ is the characteristic pressure line, it being again assumed that the boiler is of the forced passage type and that feed water is supplied thereto by a centrifugal pump. As compared to Figs. 1 and 2, the pressure $h$ of the operating medium is not constant over the entire range of load Q, but it increases with increase in load and vice versa. The curves $n^1_0$, $n^1_1$ and $n^1_2$ in Fig. 4 show the relationship between the pressure and the quantity delivered for three different pump speeds. The points of intersection $B^1_0$, $B^1_1$, and $B^1_2$ of the characteristic line $K^1$ with these curves determine the corresponding operating points and/or the speeds of the centrifugal pumps at the corresponding boiler loads $Q_0$, $Q_1$ and $Q_2$.

From Figs. 1 to 4 inclusive, it will be seen that my improved steam generator, instead of supplying steam at constant pressure, supplies such steam at variable pressure and constant temperature, the pressure depending upon the load. Variable pressure cycle operation may be secured with any forced passage boiler so long as my improved controlling features are used. The heating surface may be of the once-through tubular type or elements thereof may be connected to drums or the like. Variation in pressure, such that the pressure increases proportionately to the load causes variation in specific volume of steam supplied to the prime mover, the specific volume varying inversely with the pressure. In consequence of variability of specific volume, it will be seen that the flow of steam supplied to the prime mover may be varied to suit the load requirements with maintenance of substantially constant volume at all loads, with the result that flow passages, including passages in the turbine, have a much wider utility for the passage of steam, it being possible, without any variation in such passages, to vary the weight flowing without variation in volume or velocity of steam. Instead of having an admission valve whose passage area depends upon the load, as with the constant pressure type plant and as shown in Fig. 3, in accordance with my invention an admission or control valve, as such, is not essential; and, if one is used, as illustrated in Fig. 5, it may occupy substantially the same position defining substantially the same inlet area throughout the load range, the necessary variation requirements to meet load variation being taken care of by variation in pressure of steam delivered from the generator.

Variable pressure operation, as compared with throttling in a single steam path, has the advantage of higher efficiency in that no fall of pressure occurs without performance of work. An important advantage of the variable pressure arrangement is that the turbine may be constructed with a single steam path without the use of controlled nozzle groups or by-passing, thereby reducing the complexity of the turbine structure, the cost thereof, and reliability would be improved. The reason for the possibility of a relatively simple and symmetrical structure is that while the flow varies with variation in pressure, the volume and velocity remain approximately constant under variable load conditions, the specific volume varying inversely as the pressure. In other words, without any change in velocity or volume of steam flowing, the quantity of steam and heat content per unit of volume may be varied by varying the pressure. Another advantage for variable pressure operation is that, for the practicable range thereof, the adiabatic heat drop is approximately constant for variable load conditions. It will be found that, upon reference to the temperature-entropy diagram, the condenser absolute pressure line or lines are approximately parallel to the temperature curve intersecting different pressures, whereby the lines of available heat drop due to adiabatic expansion which are drawn from the maximum temperature line at different pressures to the condenser pressure line or lines are all substantially equal. Since the adiabatic heat drop is nearly equal over wide variation in loads, the steam velocity through the turbine, except for the last few stages, is nearly the same over the same variation in load. If the turbine speed remains constant, this gives practically a constant velocity ratio of blade speed to steam speed. As this ratio is of primary importance in the efficiency of the turbine, the turbine efficiency will be nearly constant over the range of load variation.

If it is assumed that a turbine is so designed as to operate at 35 atm. and at a temperature of 450° C. with the optimum vacuum and the optimum efficiency, it then develops, with a certain weight of steam, a given power. If the power increases to a peak four times the normal value, then it can be carried only if the boiler can develop the corresponding weight of steam. If the boiler pressure is increased to 160 atm. at a constant temperature of 450° C. by utilizing the increasing pressure characteristic, the specific volume of the steam decreases from 0.095 to 0.018. However, this means that the quantity of steam flowing through the boiler may be increased to five times the normal value, without increasing considerably the velocity of the steam in the boiler and—with the exception of a particular case hereinafter described—in the turbine. It is, of course, presumed that the quantity of heat corresponding to the increased quantity of steam can be developed in the furnace and imparted to the boiler system. This may, however, be easily accomplished. Consequently, utilization of the increasing pressure characteristic of the boiler causes a greater weight of steam to be forced through the turbine—as a result of the specific volume of steam decreasing with increasing pressure—the greater the pressure in the boiler will be. This results again in a novel method of regulating the prime mover connected with the boiler, insofar as the prime mover governor must balance the fluctuations of power of the prime mover which are not equalized by the variable pressure characteristic of the steam generator. If, in the diagram of Fig. 5, the load L is plotted against the time T an increasing straight line results similar to the diagram of Fig. 3 and if the positions of the regulating member R of the prime mover are plotted, a constant opening $q$ of the valve over the entire range of load is attained as compared to the conditions shown in the diagram of Fig. 3.

While, with the operating methods hitherto known, the operating medium supply to the prime mover is determined by the position of the inlet valve, the position of the valve with the present method has no influence on the supply of the operating medium, or, at most, influences the supply only to the extent of balancing the slight fluctuations of power which, as a result of the inertia of the boiler system, cannot be equalized by the latter. The above described behavior of regulation is of very great importance for the operation of the turbine, as an entirely smooth curve of the specific consumption of steam is obtained; i. e., the increase in specific consumption of steam or increase in volume and velocity, is slight with increasing load. According to a rough estimate, the increase in the specific consumption of steam from the optimum point of the turbine to approximately four times the maximum load amounts to about 12 per cent, and, under some circumstances, still less, whereas, in the case of a plant operating in the manner hitherto known, on the basis of a constant state of inlet steam, an increase by 30 to 40 per cent takes place. Regulation of this character has, moreover, the advantage that the design of the turbine is greatly simplified and the cost of manufacture is minimized.

Graph 6 in which the output L is plotted against time T, as in diagrams of Figs. 3 and 5 indicates, however, at the same time an operating method which has proved to be in many cases particularly desirable; that is to say, the use of variable pressure only above a predetermined base load which is indicated by the horizontal line G. The boiler and the prime mover are so dimensioned as to have the best efficiency for such a base load. In this connection, care must be particularly taken when determining data, that the moisture in the last turbine stages without the use of an intermediate superheater does not exceed the permissible amount. Under this condition, the turbine is so dimensioned that the valve means is not fully open but occupies an intermediate position so as to provide for equalization of small output fluctuations. If the load of the prime mover should then decrease below the base load, the boiler continues to operate with a corresponding reduction of water and heat supply in such a manner that the state of the steam remains the same as in the case of the base load, whereas the turbine by the use of its regulating apparatus is regulated in the usual manner.

These ranges of regulation are indicated in the diagram of Fig. 6 by the cross-hatched area.

The plant is regulated in response to a load or speed effect of the rotating apparatus, such effect being exerted on the feed water and heat supply means so that, with increase in load, the pressure of steam furnished from the boiler to the prime mover is increased and vice versa, the pressure being sufficient to carry the load at approximately constant prime mover speed. With the plant regulated in this way, it will be apparent that the steam speed in the boiler, the superheater, supply conduits and the turbine, except for the last stages, remains substantially constant, whereas the velocity of water in the boiler and that of steam in the condenser increases, the velocity of steam also increasing in the last stages of the turbine.

Control of the plant to secure operation in the above manner, that is, so as to generate and supply steam to the prime mover at a pressure which increases with increase in load and vice versa and at substantially constant temperature, may be secured in a variety of ways. For example, a speed governor or electrical apparatus responsive to a load or speed effect may be used. The speed or load effect may be exerted on the feed water supply means to secure the required pressure and on the combustion media supply means to secure adequate heat release for different loads.

The speed or load effect is preferably exerted on a valve between the boiler and the prime mover or turbine, the differential pressure across the valve being used as a regulating impulse for feed water, fuel and air. The regulating valve is normally not completely open so as to provide a reserve supply of energy which is immediately available in case of sudden increase in load in which case the governor, or its equivalent, opens the valve wider to make the energy reserve immediately effective to carry the increased load. As the valve is opened wider, the differential pressure thereacross changes, and the latter results in increased supplies of fuel, air and water to meet the new load condition. With attainment of operating conditions suitable to the new load, the regulating valve is restored to its normal position.

If there is a sudden decrease in load, the valve is moved in a closing direction, preventing overspeeding of the prime mover, and the resulting increase in differential pressure causes the rates of supply of media to the boiler to be reduced until equilibrium is reached, with the pressure reduced suitably to the new load and the valve restored approximately to its normal position.

To take care of lag introduced because of the inertia of the boiler and its setting, the heat supply may be overregulated relatively to the feed water supply and, with attainment of equilibrium the heat supply may be reduced so that the steam may have the approximately constant temperature. For example, the feed pump and the fuel and air feeding devices may be operated from the same motor device and the heat correcting effect secured by speed adjustment of the air and fuel feeding devices or the rates of air and fuel supply may be regulated by adjustable valves or dampers.

Power producing engines must normally be designed as condensing engines. If the above-named example is taken into consideration according to which the power of the prime movers should increase to four times the normal value and the quantity of steam necessary therefor must as a result of the unavoidable losses be increased to about five times the normal amount, difficulties will be encountered in designing the condenser, since it must deal with quantities of steam varying within a wide range. To design the condenser for the greatest possible load of the prime mover would be uneconomical, since it would be completely utilized only for a few hours a day. It is, therefore, of particular advantage to design the condenser not according to the maximum load, but to the optimum load and in such a manner that in the case of a slow flow of the cooling water the condenser be very amply dimensioned for the optimum load and that a very high vacuum is attained therein. In the case of peak loads, it is possible to increase the dissipation of heat from the steam by increasing the velocity of cooling water and to adapt the effect of condensation to the increased quantities of steam. However, this increase in velocity of the cooling water will not be sufficient in order to attain the conditions of condensation for the best load. This is, however, very important for the turbine, since the specific volume of the steam in the last turbine stages is reduced owing to the increase in pressure in the condenser; the separation of moisture is rendered difficult and the outlet loss is decreased so that a decrease in the efficiency of condensation is again equalized to a great extent by reducing the outlet loss. The circumstance that with increasing characteristic the pressure losses in the steam generator also increase is practically of no importance, since a sufficient reserve of pressure is available so that the losses in the conduit may be balanced by increasing correspondingly the inlet pressure beyond the pressure prevailing in the prime mover. No difficulties are experienced in the regulation of piston pumps. Centrifugal pumps must be correspondingly dimensioned, which, however, is by all means possible; only a change in speed is necessary in order to adjust the desired quantities of fluid to be delivered.

Owing to the fact that varying weights of steam with varying specific volumes are forced through the turbine in a variable pressure cycle power plant other questions arise as to the construction and operation of the turbine. It is known that the last blade stages in turbines of large output give rise to constructional difficulties, for the blades must have a great length so as to force, for instance, a great weight of steam through the same. As above described, it would be uneconomical to design the turbine in the present case for the greatest possible load. The optimum load for which the turbine should be rated may, however, be attained by a quantity of steam which only amounts to a fraction of the maximum. In the last stages a compromise must, consequently, be reached in the sense that, while the total maximum quantity of steam must pass through the passage area of the blading, yet the loss due to unabsorbed energy should not be so great as to result in uneconomical operation. Difficulties on this account may be particularly lessened in two ways; i. e., either by adopting the known regenerative method, that is, by bleeding steam from the turbine and using the bled steam for preheating the feed water so that the last stages of the turbine are relieved of some of the steam by connecting the auxiliary turbine necessary for the auxiliary drives to a bleeder stage of the main prime mover, the latter alternative being particularly desirable because, with variable-pressure-cycle-operation of the plant, the auxiliary turbine is also operated in a variable-pressure-cycle manner so as to operate the feedwater and combustion media supply devices suitably to the load requirements.

Auxiliary power is required for the following: The feed pump for the boiler for the forced passage of the operating medium, the condensate pump, the cooling water pump for the condenser, the fuel conveying device and the ventilators for the production of undergrate blast and induced draught. In order to simplify the plant, it is preferable that these devices be driven as far as possible by a common prime mover. In this case the well-known auxiliary turbine may be employed. Whether a mechanical coupling between the auxiliary turbine and the auxiliary devices be provided, or in view of space requirements, the auxiliary turbine be coupled with an auxiliary generator and the auxiliary devices electrically driven, or whether a mixed operation be provided so that a portion of the auxiliary devices are directly coupled to the auxiliary turbine and the remaining devices are electrically driven from an auxiliary generator is a question to be decided according to each case. However, the last-named possibility appears to be at present the most favorable. When the auxiliary turbine is operated by steam tapped from the main turbine, and as steam under variable pressure is supplied to the latter, the auxiliary turbine operates in a variable pressure cycle manner. Accordingly, the auxiliary devices operated from the auxiliary turbine will be operated in suitable relation with respect to the load requirements. For the sake of simplicity, assume that a linear relationship exists between the fluctuations of load of the turbine and the functions of the auxiliary drives; i. e., in the case of an increase in power of the turbine by a given percentage, the power of the auxiliary drives should increase to the same amount, then if the auxiliary turbine is connected to a stage of the main turbine, the inlet pressure of the auxiliary turbine varies at the bleeding point according to well-known principles with the pressure prevailing in the main turbine. The more the main turbine is, consequently, loaded, the more the pressure increases at the bleeding point, the higher the pressure at the inlet of the auxiliary turbine will be and so much more power can be supplied by the latter; i. e. a linear relationship is automatically established to a certain degree between the auxiliary drive and the main prime mover. Also the auxiliary drives operate with a variable pressure characteristic.

In electrical drives the following takes place: If the auxiliary turbine drives a generator which is not regulated to a constant voltage by influencing the exciting field, the generator voltage, as well as the frequency, vary with the speed practically according to a straight line. The power of an electric motor is determined by the armature current and the field. The field, however, remains constant, since the speed and frequency vary practically to the same extent; and, since the torque is constant, the armature current also remains constant and the motors connected to the generators operate, consequently, at a practically constant current intensity with variable voltage and variable speed, so that the operation of the steam power plant is brought into agreement with the above characteristic. It must, however, be considered that the linear relationship between the auxiliary drives and the load of the main turbine does not exist in all cases. For such auxiliary engines, an additional regulation must be then effected for correction, either by designing the electric motors as variable-speed motors or by arranging mechanical regulating members in the connecting conduits in the form of throttling flaps, valves etc.

While the velocity of steam in the steam generator which remains substantially constant according to the above statements, the velocity of water varies in the water tubes in the manner that the velocity of water decreases with decreasing load. The decrease in velocity of water causes according to well-known laws a decrease in the quantity of heat which is capable of being transmitted. It might occur that the small velocity of water in the case of a slight load causes a superheating of the tubes, since the cooling action lessens. If difficulties should arise in this case the latter may be, for instance, overcome by feeding the boiler with water of different temperature; i. e., the smaller the load the lower the temperature of the water will be. The decrease in velocity of flow is thus equalized considerably by increasing the temperature gradient, so that the tubes are not stressed within undue limits.

As to the electric machine which is driven by the turbine, one might object that such a generator would operate unsatisfactorily, since it is too large a unit for the normal load and its efficiency would be impaired. Such an operating condition may, however, be avoided by varying the cooling of the generator in accordance with the load. The generator is designed in such a manner that it operates with the best efficiency for the optimum load of the turbine. If the generating set should be now subjected to a higher load an additional cooling will be employed, which may be brought about in different ways. For instance, a particular ventilator may be installed which is put into operation only in the case of a higher load and increases the load capacity of the generator by increasing the dissipation of heat from the same or which cooperates with the auxiliary turbine in such a manner that its power increases or decreases in accordance with the power of the generator. However, it is also possible to effect another kind of cooling which is less suitable for a continuous operation, but which is very convenient in the present case since the cooling is effected by a carrier of cold, for instance, a salt solution (brine). In this case the brine is cooled and stored by a small refrigerating apparatus during the period of small loads. The storage of brine is simple and economical, since it may be carried out at atmospheric pressure, by the use of an accumulator, that is by discharging cold brine from the lower portion of the accumulator and supplying to the upper part thereof hot brine which is cooled in the upper portion of the accumulator by a tubular system. The cooling is normally effected with water in well-known circulation coolers, whose output may be increased under circumstances in the case of increased loads by increasing the velocity of air and that of water. If this increase is not sufficient, the cooling is brought about by brine. The cooling is, therefore, economical, since it is only employed within a fraction of the total operating period, and, consequently, requires only a small and, therefore, inexpensive cooling plant, so that the conditions are quite otherwise than if the cooling by salt is employed as continuous cooling. Besides, it would also be possible to subdivide the generator into two machines, one of which is operated up to a certain range of load, whereas the other is employed when this range of load is exceeded. To reduce the losses due to ventilation and friction, the second machine may, as long as it is not needed operate under vacuum.

In the accompanying drawings an embodiment of my invention is shown in which an arrangement of a high-pressure steam generator plant is diagrammatically illustrated for carrying out the method according to my invention.

The high-pressure steam generator plant consists of the steam generator 1, the main turbine 2, the main generator 3, a plurality of auxiliaries and of the devices required for regulating the machines. Either the feed pump 4 or the feed pump 5 is employed for feeding the boiler. An electric motor 6 is provided for driving the feed pump 4 and an auxiliary turbine 7 for driving the feed pump 5. The operating medium to be evaporated is at all events forced through the conduit 8 into the heating coil consisting of a plurality of series-connected heating surface parts 9, 10, 11. The generator is heated by a burner fed through the conduit 13 with a mixture of pulverized coal and air. Pulverized coal is supplied from the bunker 14 and forced into the conduit 13, for example, by means of a worm conveyor 15 driven by an electric motor 16. For conveying the fuel mixture to the conduit 13 air is simultaneously forced into the conduit 13 by means of a blower 17 driven by the motor 18. The supplies of pulverized coal and of air may be adjusted by means of the register 19 and of the damper 20, respectively. An induced draft is produced in the stack by a propeller 21 driven by a motor 22, a damper 21a being arranged in the stack for draft regulation. Further, for operating the plant the following auxiliaries are necessary: The electric motors 16, 18 and 22 are supplied with energy by an auxiliary generator 23 which is connected with the auxiliary turbine 7. Cooling water is supplied to the condenser 24 by a cooling water pump 25 driven by an electric motor 26. The condensate collecting in the condenser 24 is removed by a pump 27 driven by the motor 28. Finally the blower 29 driven by the motor 30 causes a circulation of the cooling air for the main generator 3. The motors 26, 28 and 30 may also be supplied with energy by the auxiliary generator 23. The auxiliary motors 16, 18, 22, 26, 28, 30 may also be supplied with current from the main generator 3 or the supply circuit 31. The motor 6 in operation is normally connected to the main generator 3. It may, however, be also connected to the supply circuit 31.

Steam is supplied to the main turbine 2 through the main steam conduit 32, the valve 33 and the conduit 34. The exhaust steam of the main turbine 2 passes through the conduit 35 into the condenser 24; it may, however, be also utilized in part for the feed water preheater. To this end, the main turbine 2 is branched off. The steam bled from the turbine 2 passes into the feed water preheater 40 through the conduit 36 and the valve 37 which in connection with the device 38 maintains the pressure in the conduit 39 at a constant value and preheats the feed water flowing through the coil 41.

The condensate collecting in the condenser 24 is removed from the latter by the pump 27 through the conduit 42 and forced through the conduit 43 into the heating coil 41 of the preheater 40 discharging into the collecting tank 44 and then either into the feed pump 4 or feed pump 5 through the conduit 45 to the boiler. The auxiliary turbine 7 may either be supplied with steam from the main steam conduit 32 through the conduit 46 and the regulating member 47 or it may also be fed with bleed steam from the main turbine 2 through the conduit 48. Accordingly the valve 49 must be opened and valve 50 is to be closed or reversely. The waste steam of the auxiliary turbine 7 is also supplied to the feed water preheater 40 through the conduit 51. The condensate collecting in the preheater 40 passes through the conduit 52 into the condenser 24 from where it is supplied into the generator together with condensate coming from the main turbine 2.

Regulation of the plant is effected as follows: The main turbine 2 operates a centrifugal governor 54 through the bevel gears 53. The governor is driven through a disengaging coupling 55. Movement of the governor sleeve 56 is transmitted to the piston rod 59 by the lever 58 pivotally mounted, as indicated at 57. The piston rod 59 is connected to the valve of an auxiliary control 62, the valve consisting of the two pistons 60 and 61. The adjusting device 63 for the valve 33 to be regulated is controlled in the usual manner with the aid of pressure oil by means of the auxiliary control 62. To attain a substantially parallel movement of the control a dash pot 67, an energy absorbing device 68 and a return sleeve 69 are connected to the lever 66 operated by the working piston 65. The valve 47 in the steam conduit leading to the auxiliary turbine 7 may be controlled at the same time by the above described regulating device together with the steam inlet member 33 of the main turbine 2. To this end an adjusting motor 70 is provided for the valve 47 and connected with the control conduits 73 and 74 through the control conduits 71 and 72. If the valves 75 and 76 inserted in the conduits 71 and 72 are open, the control impulses, which act on the piston 65, are transmitted to the piston 77 of the control motor 70.

The control may be effected in another manner, i. e., either in accordance with differences in pressure set up in operation at the plate 78 which is inserted in the main steam conduit 32 or in accordance with the difference in pressure resulting at the regulating member 33. The differences in pressure may act on a spring-biased piston 82 through the conduits 79 and 80 or through the conduits 81 and 82a. The piston 82 is connected through the piston rod 83 to the control pistons 84 and 85 which control the supply of oil under pressure entering as indicated at 86 to the conduits 87 and 88 and to the conduits 71 and 72. If the control impulses should be caused by the differences in pressure occurring in front and behind the plate 78, the valves 89 and 90 are to be opened, whereas the valves 91 and 92 are to be closed. However, if the control impulses are caused by the differences in pressure in front and behind the regulating member 33, the valves 89 and 90 are to be closed accordingly, whereas the valves 91 and 92 must be opened. In both cases the valves 75 and 76 must be held closed.

Instead of influencing the auxiliary control 62 by the centrifugal governor 54, this may be effected in accordance with an electrical magnitude of the main generator 3. To this end an electric regulating device 93 is provided which is operated in response to any suitable electrical characteristic, for example, voltage and its movement of adjustment is transmitted to the piston rod 59 through the lever 94. If the control should be effected from this point, the switch 95 must be closed and the coupling 55 disengaged.

The electric motors for driving the auxiliary machines are equipped with a suitable device for the control of their speed. In case additional impulses should be caused to act upon one or more of the above-mentioned motors these adjusting devices render then possible an additional or step by step regulation. This possibility of adjustment is apparent from the drawings by the fact that the motors are illustrated as three-phase commutator motors, whose brushes may be adjusted.

So long as the plant is operated with a load below a predetermined base load, the boiler 1 is supplied with feed water by the base load pump 4. The auxiliary turbine 7 is then disconnected, so that also the peak load pump 5 and the auxiliary generator 23 are, consequently, put out of operation. During this time the main turbine 2 is operated with steam of constant or substantially constant pressure.

If the base load of the plant exceeds a certain value, the delivery of the feed water may be either effected by the feed pump 5 only or together with the feed pump 4. To this end the auxiliary turbine 7 is put into operation. The steam for the auxiliary turbine may be supplied in this case, as above described, either from a stage of low pressure of the main turbine or from the main steam pipe 32.

The regulation of the output of the auxiliary turbine 7 is effected at all events by the adjusting motor 70. In this case the impulses of the piston 77 of this adjusting device may either be derived from the differences in pressure at the plate 78 or at the regulating member 33; they may, however, be also directly derived from the centrifugal governor 54 through the auxiliary control 62 and the valves 75 and 76 or from the generator side through the regulator 93.

The operation of plants with a load above the prescribed base load is characterized in that the steam supply and in connection therewith the change in power occurring in the main turbine 2 is effected under a steam pressure varying with load. The higher the load above the base load, the higher the pressure will be under which the steam is forced through the turbine or reversely. In this case the power of the turbine 2 is, consequently, further regulated only by a change in steam pressure and all delivery devices of the plant are at the same time regulated together with the auxiliary turbine 7, since they receive the current from the auxiliary generator 23. A change in speed of the auxiliary turbine or of the auxiliary generator 23 results, therefore, also in a corresponding change in speed of the various delivery devices. The supply of fuel, air and feed water as well as the speed of the motors 25, 27 and of the blower 29 is, consequently, regulated at the same time within a wide range.

I claim as my invention:

1. In a power plant, a prime mover, a boiler supplying steam to the prime mover, heat supply means for the boiler, feed water supply means for supplying water to the boiler and determining the operating pressure, a governor operated by the prime mover and controlling operation of the feed water supply means so that the boiler operating pressure increases with increases in prime mover load and vice versa, and means providing for adjustment of the heat supply means so that steam having a desired temperature may be secured.

2. In a power plant, a boiler of the forced-flow tubular type, a prime mover, a conduit for supplying steam from the boiler to the prime mover, means for supplying media to the boiler to secure generation of steam under pressure suitable to the load, speed-responsive means operated by the prime mover to provide a governing force, means responsive to the governing force for regulating the boiler media supply means so that steam is generated by the boiler at a pressure dependent upon the load, a valve in said conduit and which is normally nearly wide open, and means responsive to said governing force for moving said valve such that, with an increase in load, the valve is opened wider to provide for application of reserve pressure to the prime mover to enable the latter to carry the increased load during the interval while the pressure of steam is being changed from that suitable to the old load to that suitable to the new load, and such that, with a decrease in load, the valve is moved in a closing direction to restrict the supply of steam to the prime mover while the pressure of steam generated is being decreased from that suitable to the old load to that suitable to the new load, whereupon, in either case, the means for moving the valve is operated in response to the then-existing governing force to restore said valve approximately to its normal position.

3. In a power plant, a boiler of the forced-flow tubular type, means for operating the boiler to secure generation of steam at variable pressure, a prime mover, a conduit for supplying steam from the boiler to the prime mover, a valve in said conduit and normally partly open so that it provides a differential pressure thereacross and holds a reserve pressure of steam, which reserve pressure is temporarily diminished for increasing the power of the prime mover and which reserve pressure is temporarily increased for decreasing the power of the prime mover incident to transition from one load to another, means responsive to the differential pressure for regulating said operating means, and means responsive to a load effect of the prime mover to secure movement of said valve because of load change, and later to restore it to approximately its normal position when steam generated by the boiler has attained a pressure suitable for the new load.

4. In a power plant, a steam generator, means for supplying heat and feed water to the generator, a prime mover supplied with steam by the generator, a condenser for condensing steam exhausted from the prime mover and including means for varying its condensing capacity, a system for controlling the heat and feed water supply means and the condensing-capacity-varying means so as to cause increase or decrease of the rates of supplying heat and feed water and the condensing capacity, and means responsive to load imposed on said prime mover for controlling said system.

5. In a power plant, a boiler, means for controlling operation of the boiler to secure generation of steam at variable pressure, a prime mover supplied with steam by the boiler, a driven machine operated by the prime mover and including heat-dissipating means whose effectiveness may be varied, and means responsive to a characteristic of the load imposed on the prime mover by the driven machine to regulate said controlling means so as to secure steam pressure which increases with increase in load and vice versa and to increase the effectiveness of said heat-dissipating means with increase in load and vice versa.

6. The combination with a turbine having a single and substantially invariable flow passage for steam, of means for varying the power developed by the turbine over a wide load range and including a boiler installation comprising forced-flow tubular heating surface and combustion means for supplying heat thereto, a conduit for supplying steam from the heating surface to the turbine, a feed pump for supplying feed water to the heating surface, means for supplying combustion media to the combustion means, means responsive to a load condition of the turbine for controlling the feed pump to provide steam pressure varying as the load, and means providing for adjustment of the combustion media supply relative to the feed water supply so that steam of desired temperature may be supplied to the turbine.

7. The combination with a multiple-stage main turbine having a single and substantially invariable passage for flow of steam, of means for varying the power developed by the main turbine over a wide load range and including a boiler installation comprising forced-flow tubular heating surface and combustion means for supplying heat thereto, a conduit for supplying steam from the heating surface to the main turbine, a feed pump for supplying feed water to the heating surface, means for supplying combustion media to the combustion means, an auxiliary turbine for driving the feed pump and the combustion media supply means, and means for supplying steam from an intermediate stage of the main turbine to the inlet of the auxiliary turbine.

8. The combination with a multiple-stage main turbine having a single and substantially invariable passage for flow of steam, of means for varying the power developed by the main turbine over a wide load range and including a boiler installation comprising forced-flow heating surface and combustion means for supplying heat thereto, a conduit for supplying steam from the heating surface to the main turbine, means for supplying feed water to the heating surface and for supplying combustion media to the combustion means, an auxiliary turbine for driving the last-named means, and means responsive to a load condition of the main turbine for controlling the admission of steam to the auxiliary turbine.

9. The combination with a multiple-stage turbine having a single and substantially invariable passage for flow of steam, of means for varying the power developed by the main turbine over a wide load range and including a boiler installation comprising heating surface and combustion means for supplying heat thereto, a conduit for supplying steam from the heating surface to the main turbine, a feed pump for supplying feed water to the heating surface, means for supplying combustion media to the combustion means, an auxiliary turbine for driving the feed pump and the combustion media supply means, means responsive to a load condition of the main turbine for controlling the admission of steam to the auxiliary turbine, and means providing for the supply of combustion media to the combustion means so that steam of desired temperature may be supplied from the heating surface to the main turbine.

10. The combination with a prime mover having a single and substantially invariable passage for flow of steam, of means for varying the power developed by the prime mover over a wide load range and including a boiler installation comprising forced-flow tubular heating surface and combustion means for supplying heat thereto, a conduit for supplying steam from the heating surface to the prime mover, a feed pump for supplying feed water to the heating surface, means for supplying combustion media to the combustion means, operating means for said pump and the combustion media supply means, means providing an orifice in said conduit, means responsive to differential pressure across the orifice for controlling said operating means, and means responsive to a load condition of the prime mover to vary temporarily the area of the orifice so that said operating means may be controlled to provide for the supply of steam from the heating surface to the prime mover which increases in pressure with increase in load and vice versa, and to restore approximately the normal orifice area when steam is supplied at the pressure required by the load.

11. The combination with a prime mover having a single and substantially invariable passage for flow of steam, of means for varying the power developed by the prime mover over a wide load range and including a boiler installation comprising forced-flow tubular heating surface and combustion means for supplying heat thereto, a conduit for supplying steam from the heating surface to the prime mover, means for supplying feed water to the heating surface and for supplying combustion media to the combustion means, means responsive to a load condition of the prime mover for developing a controlling effect, means under control of said controlling effect for regulating said supply means so that pressure of steam supplied from the heating surface to the prime mover increases with increase in load and vice versa, a valve arranged in said conduit and normally open to such an extent that a relatively small pressure drop exists thereacross, and means under control of said controlling effect for moving the valve, incident to load change, so that steam is applied to the prime mover to meet the new load until the heating surface supplies steam suitable to the new load and said last-named means operating to approximately restore the valve to its normal position incident to the condition of the steam supply approaching that required for the new load condition.

12. The combination with a prime mover having a single and substantially invariable passage for the flow of steam, means for varying the power developed by the prime mover and including a boiler installation including heating surface and combustion means for supplying heat thereto, a conduit for supplying steam from the heating surface to the prime mover, a feed pump for supplying feed water to the heating surface and serving to determine the steam pressure, means for supplying combustion media to the combustion means, a valve in said conduit and normally occupying a nearly wide-open position, means responsive to differential pressure across said valve to control the feed pump such that an increase in differential pressure reduces the steam pressure and vice versa, and speed-responsive means for controlling said valve.

13. In a power plant, a prime mover; a boiler installation including heating surface and combustion means for supplying heat thereto; a conduit for supplying steam from the heating surface to the prime mover; and means for securing operation of the plant over a large power output range and comprising a first feed pump for supplying feed-water to the heating surface and determining the steam pressure, means for supplying combustion media to the combustion means, a first motor device for operating the first feed pump, means responsive to prime mover load demand for controlling the first motor device to operate the first feed pump so that the boiler operating pressure increases with increase in prime mover load and vice versa, means providing for adjustment of the combustion media supplying means so that superheated steam at approximately constant temperature may be supplied to the prime mover at different outputs of the latter, a second feed pump for supplying water to said heating surface, a second motor device for operating the second feed pump and the combustion media supply means, and means for rendering either motor device effective so that the first motor device is effective for the upper portion of the total range of prime mover output and the second motor device is effective for the lower portion thereof.

14. In a power plant, a prime mover; a boiler installation including heating surface and combustion means for supplying heat thereto; a conduit for supplying steam from the heating surface to the prime mover; and means for securing operation of the plant over a large power output range and comprising a first feed pump for supplying feed-water to the heating surface and determining the steam pressure, a first motor device for driving the first feed pump, means for supplying combustion media to the combustion means, means for transmitting power from the first motor device to the combustion media supply means, means responsive to prime mover load demand for controlling the first motor device to operate the first pump to increase the steam pressure with increases in prime mover load and vice versa, a second motor device for driving the second pump, means including a portion of said power transmitting means for transmitting power from the second motor device to the combustion media supply means, means for rendering either motor device effective so that the first motor device is effective for the upper portion of the total range of prime mover output and the second motor device is effective for the lower portion thereof, and means providing for adjustment of the means for supplying combustion media relative to the supply of feedwater so that steam of desired temperature may be supplied from the heating surface to the prime mover.

15. In a power plant, a prime mover and means for supplying to the prime mover superheated steam under pressure dependent upon the desired output, said means comprising a boiler having heating surface of the series flow tubular type, means for supplying heat to the heating surface, feed water supply means for supplying water to the heating surface and determining the operating pressure, means responsive to prime mover load demand for controlling operation of the feed water and of the heat supply means so that the boiler operating pressure increases with increases in prime mover output and vice versa, and means providing for adjustment of the heat supply means independently of the feed water supply means so that steam having a desired temperature may be supplied to the prime mover at different outputs of the latter.

16. In a power plant, a prime mover and means for supplying to the prime mover superheated steam under pressure dependent upon the desired output, said means comprising a boiler including tubular heating surface of the series flow type, means for supplying heat to the heating surface, feedwater supply means for supplying water to the heating surface and determining the operating pressure, a motor device operatively connected to the heat supply means and to the feedwater supply means for operaing the latter, means responsive to prime mover load demand for controlling the operation of the motor device to secure operation of the heat supply means and feedwater supply means so that the boiler operating pressure increases with increases in prime mover output and vice versa, and means providing for adjustment of the heat supply means relatively to the feedwater supply means so that steam having a desired temperature may be supplied to the prime mover at different outputs of the latter.

17. In a power plant, a prime mover, a boiler including heating surface of the series forced flow type, means for supplying heat to the heating surface, a feed pump for supplying water to the heating surface and determining the operating pressure, a motor device connected to the feed pump, means for transmitting power from the motor device to the heat supply means, a governor operated by the prime mover and controlling the operation of the motor device so that the feed pump and the heat supply means may be operated to provide boiler operating pressure which increases with increases in prime mover output and vice versa, and means providing for adjustment of the heat supply means relatively to the feed pump so that steam having a desired temperature may be supplied to the prime mover at different outputs of the latter.

18. In a power plant, a prime mover, a boiler, means for supplying media to the boiler to secure steam generation, a conduit for supplying steam from the boiler to the prime mover, orifice means in said conduit, means for changing the flow area of said orifice means, means responsive to a load variation of the prime mover for controlling the last-named means such that, with an increase in load, the orifice flow area is increased and, with a decrease in load, the orifice flow area is decreased, and means responsive to differential pressure across the orifice means for controlling the means for supplying media to the boiler.

19. In a power plant, a prime mover, a boiler, means for supplying media to the boiler to secure steam generation and including a feed pump, a conduit for supplying steam from the boiler to the prime mover, orifice means in said conduit, means for changing the flow area of said orifice means, means responsive to a load variation of the prime mover for controlling the last-named means such that, with an increase in load, the orifice area is increased and vice versa, and means responsive to differential pressure across the orifice for controlling said feed pump so that the operating pressure of the boiler is increased with increase in prime mover load and vice versa.

20. In a power plant, a prime mover, a boiler, a feed pump for supplying water to the boiler and determining the operating pressure of the latter, means for supplying heat to the boiler, a conduit for supplying steam from the boiler to the prime mover, orifice means in the conduit, means for changing the flow area of the orifice means, means responsive to change from a first load condition to a second load condition of the prime mover and cooperating with the last-named means to effect change in the orifice flow area temporarily until such time as the boiler is operating to supply steam to the prime mover in accordance with the second load condition, said means responsive to load change operating to increase the orifice flow area because of increase in load and vice versa, and means responsive to differential pressure across the orifice for controlling said feed pump so that the latter is operated to supply water to the boiler in such manner that the operating pressure is increased with increase in load and vice versa.

21. In a power plant, a prime mover, a boiler, a feed pump for supplying water to the boiler and determining the operating pressure of the latter, combustion apparatus for supplying heat to the boiler, means for supplying combustion media to the combustion apparatus, a conduit for supplying steam from the boiler to the prime mover, orifice means in said conduit, means for changing the flow area of said orifice means, means responsive to speed of the prime mover incident to change from a first load condition to a second load condition for controlling the last-named means to effect a change in orifice flow area temporarily until such time as the boiler is operating in accordance with the second load condition when the original orifice flow area is approximately restored, together with restoration of the original predetermined pressure drop over the orifice flow area, said orifice flow area being temporarily increased with increase in load and vice versa, means responsive to differential pressure across said orifice means for controlling the feed pump so that the latter is operated to supply feed water to the boiler in such manner that the operating pressure of the latter is increased with increase in load and vice versa, and means providing for adjustment of said combustion media supply means in such manner that steam of predetermined temperature may be supplied from the boiler to the prime mover irrespective of the operating pressure.

22. In a power plant, a multiple-stage turbine and means for supplying thereto superheated steam at a substantially constant temperature and at a pressure dependent upon the desired output, said means and the turbine providing a substantially invariable flow passage for steam for different outputs and said means including a steam generator, heat supply means for the generator, feed water supply means for supplying water to the generator and determining the operating pressure, means responsive to turbine load demand for controlling the operation of the feed water supply means so that the generator operating pressure increases with increases in turbine output and vice versa, and means providing for adjustment of the heat supply means so that superheated steam at approximately constant temperature may be supplied to the turbine at different outputs of the latter.

23. The method of developing power by means of a prime mover supplied with motive fluid by a generator which comprises supplying the motive fluid in the liquid state to the generator so that the motive fluid pressure increases with increases in prime mover output and vice versa and supplying heat to the generator to convert the motive fluid from the liquid to the vapor state and to superheat it to a desired temperature in order that the volumetric rate of flow of motive fluid in the superheated vapor state to the prime mover at different outputs of the latter may remain approximately constant.

24. The method of developing power by means of a prime mover supplied with superheated steam by a generator which comprises supplying water to the generator so that the superheated steam pressure increases with increases in prime mover output and vice versa over a pressure range varying approximately from 35 atmospheres to 160 atmospheres and supplying heat to the generator to convert the water from the liquid to the vapor state and to superheat it to a temperature of the order of 450° C. at different prime mover outputs.

25. The method of developing power by means of a prime mover supplied with motive fluid by a generator which comprises supplying fuel and air as elements of combustion and motive fluid in the liquid state to the generator so that the motive fluid pressure and the supplies of elements of combustion increase with increases in prime mover output and vice versa, said elements of combustion providing for conversion of motive fluid from the liquid to the vapor state and for superheating the vapor, and adjusting the supplies of the elements of combustion relative to the motive fluid supply and to each other to maintain an approximately constant superheated vapor temperature at different prime mover outputs in order that the volumetric rate of flow of motive fluid in the superheated vapor state to the prime mover may remain approximately constant.

26. The method of developing power by means of a prime mover supplied with motive fluid by a generator which comprises, up to and including a predetermined prime mover output, supplying motive fluid in the liquid state to the generator at substantially a constant pressure and supplying heat to the generator to convert the motive fluid from the liquid to the vapor state and to superheat the vapor and which comprises, for prime mover outputs above said predetermined output, supplying the motive fluid in the liquid state to the generator so that the motive fluid pressure increases with increase in prime mover output and vice versa and supplying heat to the generator to convert the motive fluid from the liquid to the vapor state and to superheat it to a desired temperature in order that the volumetric rate of flow of motive fluid in the superheated vapor state to the prime mover at different outputs above said predetermined output may remain approximately constant.

HANS GLEICHMANN.